(12) United States Patent
Andersson et al.

(10) Patent No.: US 10,677,385 B2
(45) Date of Patent: Jun. 9, 2020

(54) CONDUIT CONNECTION ASSEMBLY

(71) Applicant: VOLVO TRUCK CORPORATION, Göteborg (SE)

(72) Inventors: Peter Andersson, Södra Sandby (SE); Fredrik Rahm, Hörby (SE)

(73) Assignee: VOLVO TRUCK CORPORATION, Göteborg (SE)

( * ) Notice: Subject to any disclaimer, the term of this patent is extended or adjusted under 35 U.S.C. 154(b) by 326 days.

(21) Appl. No.: 15/566,274

(22) PCT Filed: May 3, 2016

(86) PCT No.: PCT/EP2016/059850
§ 371 (c)(1),
(2) Date: Oct. 13, 2017

(87) PCT Pub. No.: WO2016/177705
PCT Pub. Date: Nov. 10, 2016

(65) Prior Publication Data
US 2018/0299057 A1    Oct. 18, 2018

Related U.S. Application Data

(63) Continuation-in-part of application No. PCT/EP2015/060054, filed on May 7, 2015.

(51) Int. Cl.
*F16L 55/052*    (2006.01)
*F01N 13/18*    (2010.01)
(Continued)

(52) U.S. Cl.
CPC .............. *F16L 55/052* (2013.01); *F01D 9/02* (2013.01); *F01D 9/06* (2013.01); *F01N 1/026* (2013.01);
(Continued)

(58) Field of Classification Search
CPC ...... F02B 37/18; F02B 37/183; F02B 37/186; F02B 37/16; F16L 55/04; F05D 2260/6022
(Continued)

(56) References Cited

U.S. PATENT DOCUMENTS 4,850,797 A    7/1989    Benson
7,958,728 B2    6/2011    Dumas et al.
(Continued)

FOREIGN PATENT DOCUMENTS

CN    100538028 C    9/2009
DE    2239314 A1    2/1974
(Continued)

OTHER PUBLICATIONS

Notification of First Office Action dated Apr. 1, 2019 in corresponding Chinese Patent Application No. 201680026554.6.
(Continued)

*Primary Examiner* — Laert Dounis
*Assistant Examiner* — Edward Bushard
(74) *Attorney, Agent, or Firm* — Venable LLP; Jeffri A. Kaminski

(57) ABSTRACT

A conduit connection assembly includes a first conduit part and a second conduit part, assembled to form a conduit connection delimiting a first fluid conducting volume from a second fluid conducting volume. The first and second fluid conducting volumes communicate with each other via a pressure change inducing device. During use of the conduit connection assembly, the pressure in the first conducting volume is higher than the pressure in the second conducting volume. A cavity is formed between the first and second conduit parts at a distance from the first fluid conducting volume, and a draining connection is adapted to provide a communication between the cavity and the second fluid
(Continued)

conducting volume. A slot, formed by the assembly of the two conduit parts, provides a communication between the first fluid conducting volume and the cavity.

26 Claims, 11 Drawing Sheets

(51) Int. Cl.
*F02B 33/44* (2006.01)
*F02B 37/02* (2006.01)
*F16L 23/00* (2006.01)
*F16L 39/00* (2006.01)
*F16L 55/04* (2006.01)
*F04D 29/08* (2006.01)
*F02C 7/28* (2006.01)
*F02B 39/16* (2006.01)
*F01D 9/02* (2006.01)
*F04D 29/66* (2006.01)
*F01N 1/02* (2006.01)
*F01D 9/06* (2006.01)
*F02B 29/04* (2006.01)
*F02B 41/10* (2006.01)
*F02M 35/104* (2006.01)

(52) U.S. Cl.
CPC ..... *F01N 13/1805* (2013.01); *F01N 13/1827* (2013.01); *F01N 13/1855* (2013.01); *F02B 29/04* (2013.01); *F02B 33/44* (2013.01); *F02B 37/02* (2013.01); *F02B 39/16* (2013.01); *F02B 41/10* (2013.01); *F02C 7/28* (2013.01); *F02M 35/104* (2013.01); *F04D 29/083* (2013.01); *F04D 29/665* (2013.01); *F16L 23/00* (2013.01); *F16L 39/00* (2013.01); *F16L 55/04* (2013.01); *F01N 2260/16* (2013.01); *F05D 2220/40* (2013.01); *F05D 2260/606* (2013.01); *F05D 2260/6022* (2013.01); *Y02T 10/144* (2013.01); *Y02T 10/146* (2013.01); *Y02T 10/163* (2013.01)

(58) Field of Classification Search
USPC .......................................................... 60/602
See application file for complete search history.

(56) References Cited

U.S. PATENT DOCUMENTS

2013/0111901 A1   5/2013   Leone et al.
2014/0190164 A1   7/2014   Atz et al.

FOREIGN PATENT DOCUMENTS

| DE | 10339539 A1 | 3/2005 |
| DE | 102005046144 A1 | 6/2006 |
| DE | 102008015363 A1 | 9/2009 |
| EP | 0573895 A1 | 12/1993 |
| FR | 2869367 A1 | 10/2005 |
| FR | 281101 A1 | 7/2006 |

OTHER PUBLICATIONS

International Search Report (dated Jul. 11, 2016) for corresponding International App. PCT/EP2015/060054.
International Preliminary Report on Patentability (dated Sep. 5, 2017) for corresponding International App. PCT/EP2015/060054.

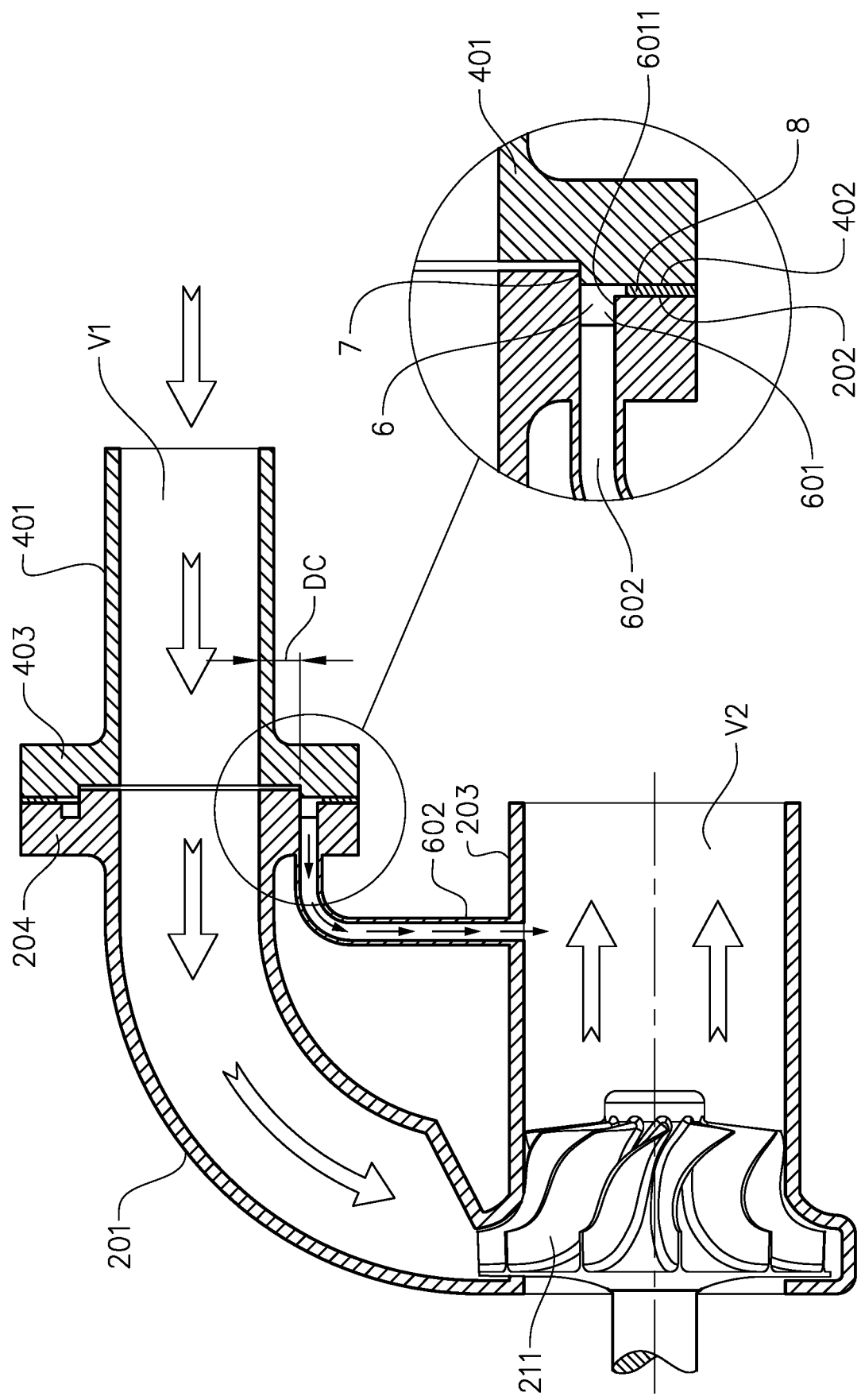

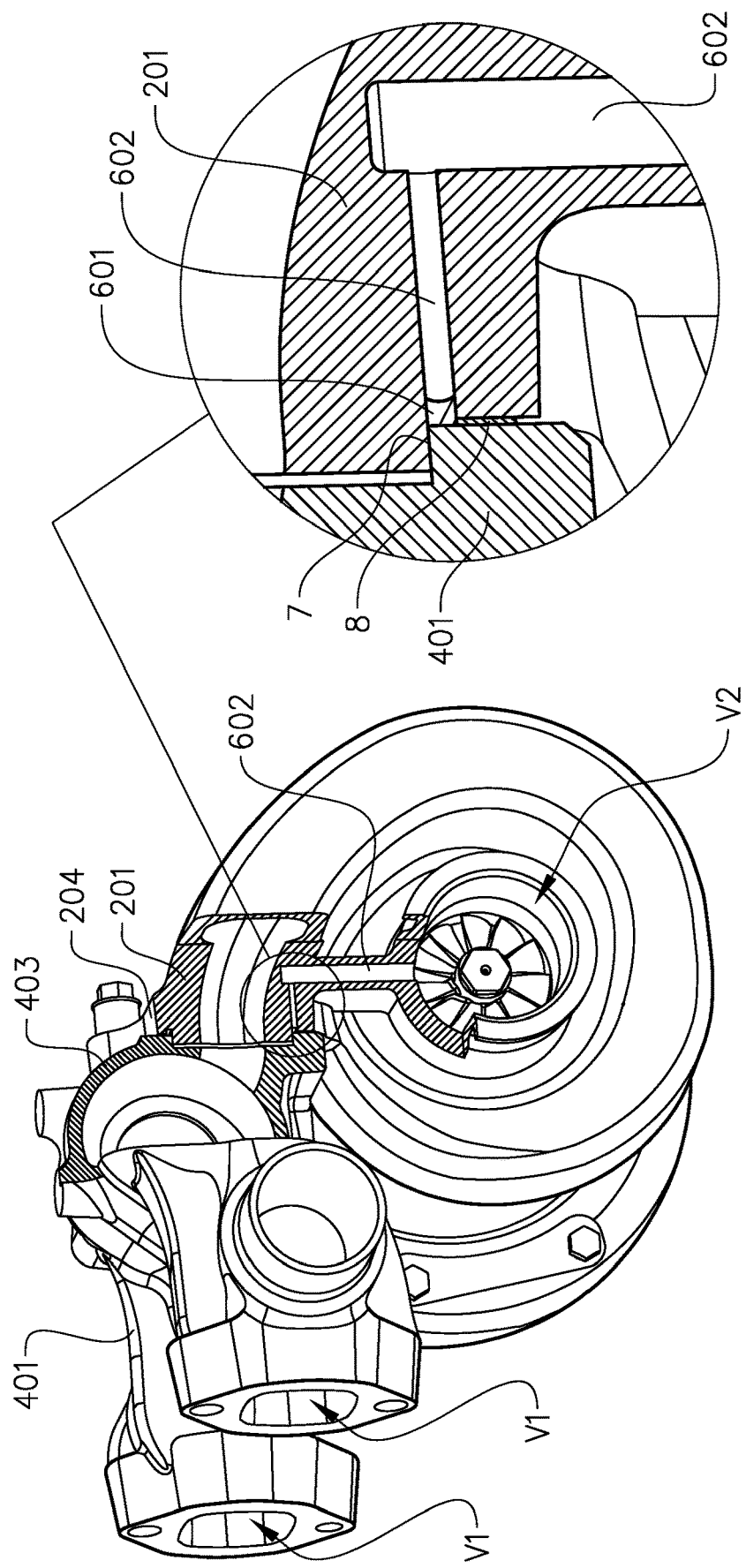

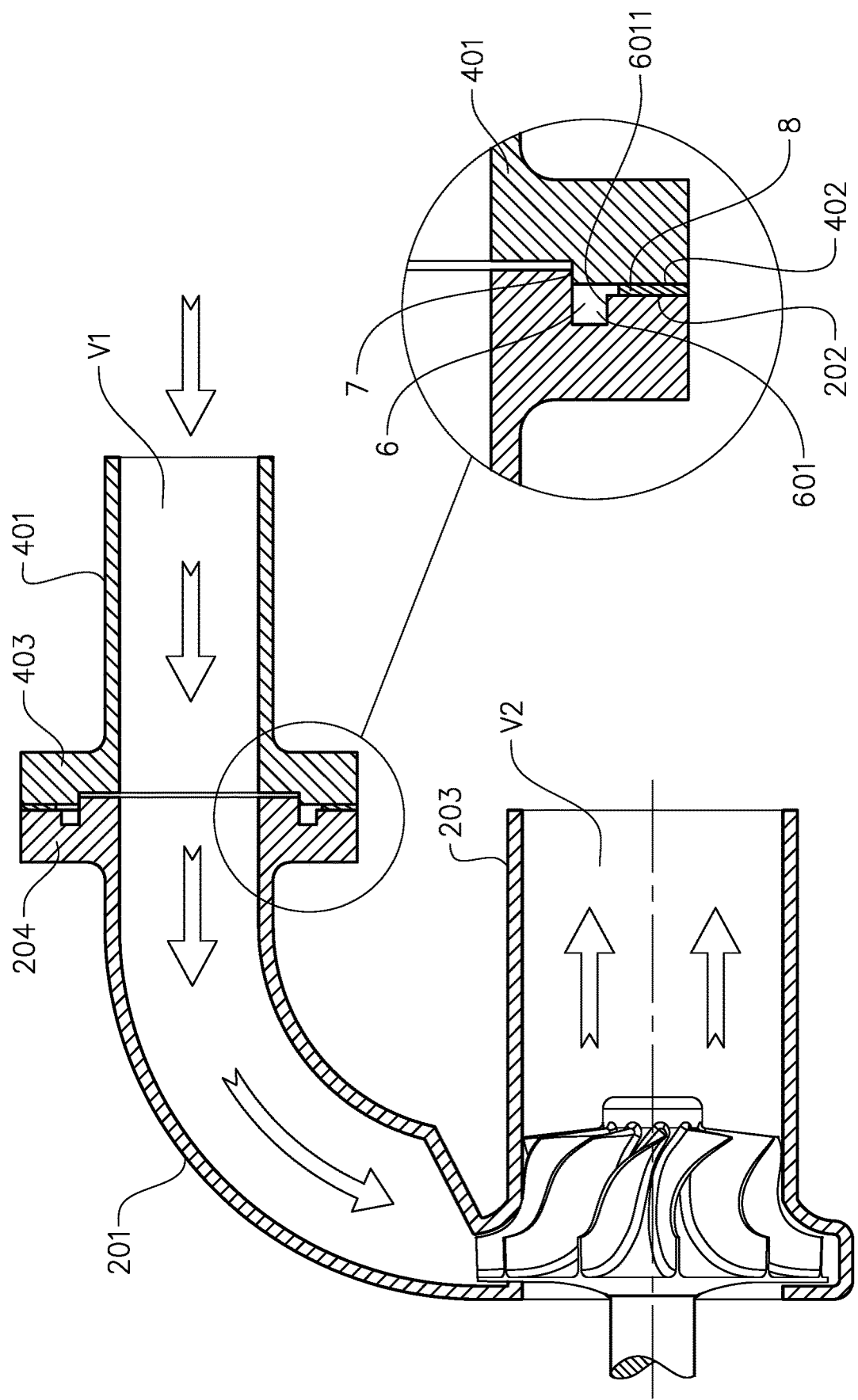

CONDUIT CONNECTION ASSEMBLY

BACKGROUND AND SUMMARY

The invention relates to a conduit connection assembly, a turbo charger for an internal combustion engine, an internal combustion engine and a vehicle.

In typical vehicles, conduits provide air to an internal combustion engine of the vehicle, and guide exhaust gases from the engine. Engine operation may cause pulsations in such conduits, which may have detrimental effects to devices in the conduits or the operation of the engine. This problem is particularly pronounced where the engine is provided with a turbo charger, and the conduits are located where high pressures occur during turbo charger operation.

US2013111901A1 describes for a turbo charged engine a pulsation absorption device with a resonator, a diaphragm, or a bladder, in order to avoid compressor surge which according to US2013111901A1 might be caused by pulsations in the exhaust flow. ER2879689A1 describes a damping chamber on a compressor side of a turbo charger for reducing pressure pulses from the compressor. However, such known pulsation damping devices are complex and therefore add cost to the vehicle. Also, said FR2879689A1 does not provide any relief of pressure pulses on the turbine side of the turbo charger. Where a device according to said US2013111901A1 is placed on the turbine side, upstream of a turbo charger, the reduced peak pressure can reduce the performance of the turbo charger.

DE2239314 presents openings which extend from a flanged connection of a conduit, and it is suggested that this provides drainage of leakage. However, there is still a desire to reduce the risk of leakage at conduit connections, for example in air and exhaust conduit connections for vehicle internal combustion engines.

It is desirable to reduce the effect of pressure pulses in conduits, in particular conduits of, or connected to, an internal combustion engine. It is also desirable to reduce the effect of pressure pulses in conduits connecting an engine block of an internal combustion engine to a turbo charger. It is also desirable to reduce the risk of leakage in conduit connections exposed to high pressures.

According to an aspect of the present invention, a conduit connection assembly is provided comprising a first conduit part and a second conduit part, adapted to be assembled to form a conduit connection delimiting a first fluid conducting volume, characterized in that the conduit connection assembly presents a second fluid conducting volume, the first and second fluid conducting volumes being arranged to communicate with each other via a pressure change inducing device so as to form a common fluid guide, whereby during use of the conduit connection assembly the pressure in the first conducting volume is higher than the pressure in the second conducting volume, in that a cavity is formed between the first and second conduit parts at a distance from the first conducting volume, and in that a draining connection is adapted to provide a communication between the cavity and the second fluid conducting volume.

The pressure change inducing device may be e.g. a turbine of a turbo charger, a compressor of a turbo charger, an exhaust brake, or a turbo compound unit. It should be noted that the invention is applicable, not only to exhaust and air intake systems for internal combustion engines, as exemplified below. The invention may be used in any suitable application with a conduit presenting a conduit connection which may be subjected to a high pressure and/or pressure pulses, and there is a pressure change inducing device along the conduit. Uses may be found e.g. in air conditioning systems, fuel systems or cooling systems.

Due to the distance between the first conducting volume and cavity, it will be possible to restrict, e.g. as exemplified below, the transport of fluid from the first conducting volume to the cavity, i.e. fluid transport to the cavity radially inside of the cavity. The first and second conduit parts may be adapted to form, in their assembled state, a sealing abutment radially outside the cavity. The cavity and the sealing abutment may extend around the fluid conducting volume, preferably forming respective closed loops. The first and second conduit parts may be adapted to form the sealing abutment by directly contacting each other, or by a sealing element between the first and second conduit parts, which sealing element may be a gasket.

During use of the conduit connection assembly, e.g. during operation of an engine with which it communicates, since the pressure in the first conducting volume is higher than the pressure in the second conducting volume, the draining connection will provide a flow from the cavity to the second fluid conducting volume. By means of the draining connection, it will be possible to reduce the exposure of the sealing abutment radially outside of the cavity to pressure pulses as well as a high mean pressure in the first fluid conducting volume. The combination, herein also referred to as a pressure reducing volume, of the draining connection and the cavity provides for an effective evacuation of first fluid conducting volume pressure affecting the sealing abutment. The pressure reducing volume provides a communication between the interface between first and second conduit parts and the second fluid conducting volume. The draining connection bypasses the pressure change inducing device. Thereby, the draining connection provides for fluid, being transported or "leaking" between the first and second conduit parts, from the first fluid conducting volume to the cavity, to bypass the pressure change inducing device. Thereby the pressure in the cavity may be reduced and the stress on the sealing abutment, radially outside of the cavity, will be reduced.

The first and second conduit parts may present respective connection surfaces adapted to face each other. The cavity may be at least partly formed by at least one of the connection surfaces and/or partly located directly adjacent at least one of the connection surfaces.

According to another aspect of the invention, a conduit connection assembly is provided comprising a first conduit part and a second conduit part, adapted to be assembled to form a conduit connection delimiting a fluid conducting volume, wherein one of the first and second conduit parts presents a connection surface adapted to face the other of the first and second conduit parts, wherein a pressure reducing volume is at least partly formed in the connection surface, wherein the pressure reducing volume is partly formed by a cavity, and the first and second conduit parts are adapted to form, in their assembled state, a sealing abutment radially outside the cavity, wherein the pressure reducing volume presents a draining connection, wherein the conduit connection assembly further is adapted to present, in its assembled state, a second fluid conducting volume, the draining connection being adapted to provide a communication between the cavity and the second fluid conducting volume, wherein the first fluid conducting volume is adapted to communicate with an internal combustion engine, whereby during operation of the internal combustion engine, the pressure in the first conducting volume is higher than the pressure in the second fluid conducting volume.

Providing the pressure reducing volume at least partly formed in the connection surface allows for local pressure pulse reduction or damping to reduce pressure pulse effects to the connection. For example, where a seal or gasket is provided at the connection, the wear of the seal may be reduced, so that the life of the seal may be increased, and/or the use of simpler and less costly seals may be allowed. In particular, where the connection is provided in a conduit connecting an engine block to a turbo charger, whereby the connection is exposed to a high pressure during turbo charger operation, the pressure reducing volume formed in the connection surface will considerably reduce the effects of pressure pulses to a sealing abutment of the connection. E.g., where such an abutment includes a gasket, the invention may allow for a cheap one layer stainless steel gasket to be used instead of an expensive three layer nickel-chromium alloy gasket.

Also, the local pressure pulse reduction aimed at reducing pressure pulse effects on the connection, makes it possible to retain the pressure pulses in the first fluid conducting volume, which is beneficial to a turbo charger operation where the connection is provided upstream of a turbine charger, on the turbine side thereof.

Since the first and second conduit parts are adapted to form, in their assembled state, a sealing abutment radially outside the cavity, the pressure reducing volume can provide a barrier to the sealing abutment to protect it against pressure pulses.

Since the pressure reducing volume presents a draining connection, it will, as also suggested above, be possible to reduce the exposure of a sealing abutment in the conduit connection assembly to a high mean pressure in the first fluid conducting volume. For example, in combination with a narrow slot, exemplified closer below, providing a communication between the first fluid conducting volume and the pressure reducing volume, e.g. with a slot width of 0.001-1 mm, preferably 0.005-0.5 mm, more preferably 0.01-0.1 mm, any diversion of a flow in the first fluid conducting volume into the draining connection will be kept advantageously small. In combination with the cavity, presenting a closed loop shape, e.g. by being ring shaped, and extending around the first fluid conducting volume, a homogenous and rapid evacuation of fluid conducting volume pressure affecting the sealing abutment can be provided.

As exemplified further below, to effectively reduce peak pressure impact on the connection, the pressure reducing volume is preferably specifically adapted to reduce pressure pulses from the first fluid conducting volume.

Preferably, the pressure reducing volume is at least partly delimited by the first conduit part as well as the second conduit part. This allows for simple manufacturing of the pressure reducing volume, since the connection surfaces may be easily accessible for some of the manufacturing measures before assembly of the conduit connection assembly, leaving the completion of a substantially enclosed pressure reducing volume to be provided as a result of the assembly.

Preferably, the pressure reducing volume is at least partly formed by a depression in the connection surface. By forming at least a part of the pressure reducing volume by such a depression, the provision of the pressure reducing volume during manufacturing may be facilitated.

Preferably, the cavity is close loop shaped, e.g. ring shaped, and extends around the first fluid conducting volume. Thereby, the cavity can be arranged to be distributed along a sealing abutment of the conduit connection assembly, thereby providing a local and effective protection of the abutment against pressure pulses on the first fluid conducting volume.

Preferably, the conduit connection assembly may present a slot adapted to provide a communication between the first fluid conducting volume and the pressure reducing volume. Such a slot will together with the pressure reducing volume contribute to the reduction of pressure pulses from the first fluid conducting volume. Preferably, the first and second conduit parts are adapted to form the slot in their assembled state. Thereby, the slot may be provided in a simple manner during manufacturing by assembling the first and second conduit parts.

Preferably, the pressure reducing volume is 5,000 to 50,000 times larger than a volume occupied by the slot. Such a high ratio of the volume of the pressure reducing volume and the volume occupied by the slot will effectively reduce the peak pressures of the pressure pulses in the first fluid conducting volume, and may thereby reduce pressure peak exposure to a sealing abutment of the conduit connection assembly.

Preferably, the cavity and the slot are closed loop shaped, e.g. ring shaped, and extending around the first fluid conducting volume, the cavity presents, in a cross-section perpendicular to a circumferential direction of the first fluid conducting volume, a cross-sectional area which is 100,000 to 1,000,000 times larger than the slot width squared. This will further secure a reduction peak pressure exposure to a sealing abutment of the conduit connection assembly. It should be noted that the circumferential direction of the first fluid conducting volume is preferably defined by the local direction of a gas flow in the first fluid conducting volume. The local direction of the gas flow is the direction of the gas flow at the conduit connection. The circumferential direction is a direction which is perpendicular to an axial direction of the gas flow, and perpendicular to a radial direction of the gas flow.

Preferably, the slot extends at least partly in an axial direction of the conduit connection assembly in its assembled condition. An axial extension of the slot will facilitate production with high tolerance requirements on the slot. In some embodiments however, the slot extends at least partly in a radial direction of the conduit connection assembly in its assembled condition. It should be noted that the axial direction of the conduit connection assembly is preferably defined as the local direction of a gas flow in the first fluid conducting volume, at the conduit connection. The radial direction of the conduit connection assembly is perpendicular to said axial direction.

Preferably, the width of the slot is 0.001-1 mm, preferably 0.005-0.5 mm, more preferably 0.01-0.1 mm. Such a relatively low slot width will, in connection to a relatively large pressure reducing volume, provide a particularly effective peak pressure damping, especially where the conduit connection assembly is provided in an exhaust or inlet system of a vehicle.

Preferably, the slot extends around the first fluid conducting volume, and the length of the slot, as seen in a cross-section perpendicular to a circumferential direction of the first fluid conducting volume, is at least 0.5 mm, preferably at least 1 mm, more preferably at least 2 mm. Such a slot length will provide a dimension of the slot facilitating manufacturing, while retaining an effective pressure pulse damping contribution.

Preferably, the slot extends around the first fluid conducting volume in the circumferential direction. The slot may present the shape of a closed loop. The slot may be e.g. ring shaped. The width of the slot may be defined as the smallest dimension of the slot. The length of the slot may be the dimension of the slot following the shortest distance of communication provided by the slot, from the first fluid conducting volume to the pressure reducing volume.

The cavity and the sealing abutment may extend around the first fluid conducting volume, preferably forming respective closed loops. The cavity may be at least partly formed by a depression in the connection surface.

The first and second conduit parts may be adapted to form the sealing abutment by directly contacting each other. Thus, a sealing element, such as a gasket, is omitted, which is made possible by the pressure reducing volume reducing pressure pulses, and this will reduce complexity and cost of the conduit connection assembly.

Alternatively, the first and second conduit parts might be adapted to form the sealing abutment by a sealing element, which might be a gasket, between the first and second conduit parts. As mentioned, in such embodiments, the invention makes it possible to use simpler and less costly sealing elements.

Preferably, the first conduit part is a turbine inlet conduit of a turbo charger for an internal combustion engine. The second conduit part might be an exhaust gas conveying part, e.g. an exhaust gas outlet manifold, adapted for conveying exhaust gases from an internal combustion engine. Thereby, the invention will be implemented to provide an effective protection of a sealing abutment at the taxing environment of the exhaust gas stream with the pressure pulses from the engine.

The invention may also be implemented to provide an effective protection of a sealing abutment at other locations with challenging environments, e.g. with high pulsating pressures. The first conduit part might be a compressor outlet conduit of a turbo charger for an internal combustion engine. The second conduit part might be a charged air conduit for an internal combustion engine. The first conduit part can be an intercooler for an air inlet of an internal combustion engine. The first conduit part might be an internal combustion engine and the second conduit part can be an air inlet manifold or an exhaust gas outlet manifold. The first conduit part might be a turbo compound unit.

Preferably, the draining connection is adapted to provide a communication between the first and second fluid conducting volumes.

The pressure in the first conducting volume being, during operation of the internal combustion engine, higher than the pressure in the second conducting volume, might be due to the first fluid conducting volume being, in the assembled state of the assembly, partly formed by a turbine inlet conduit of a turbo charger for an internal combustion engine, and the second fluid conducting volume being at least partly formed by a turbine outlet conduit of the turbo charger. Thereby, due to the draining connection, the sealing abutment of the conduit connection assembly will be exposed to substantially the same pressure as that in the second fluid conducting volume. This will considerably reduce the high pressure exposure to the sealing abutment. This lower pressure will also contribute to reducing or eliminating the exposure of the sealing abutment to pressure pulses in the first fluid conducting volume. At the same time, the high pressure and the pressure pulses may be retained in the first fluid conducting volume, thereby retaining a high turbo charger efficiency.

It should be noted that preferably the cavity in completely enclosed, apart from the communication with the slot and the communication with the draining connection.

According to another aspect of the invention, a turbine inlet conduit for a turbo charger for an internal combustion engine is provided, wherein the turbine inlet conduit is adapted to be assembled to another conduit part, and presents a connection surface adapted to face the other conduit part, wherein a depression is formed in the connection surface whereby the depression is adapted to form, when the turbine inlet conduit is assembled to the other conduit part, at least a part of a pressure reducing volume.

Preferably, the depression presents a closed loop shape, e.g. by being ring shaped, and is adapted to extend around a fluid conducting volume formed by the turbine inlet conduit and the other conduit part in their assembled condition.

According to another aspect of the invention, a turbo charger for an internal combustion engine is provided, comprising a turbine inlet conduit, the turbine inlet conduit being adapted to be assembled to another conduit part, and presenting a connection surface adapted to face the other conduit part, wherein a depression is formed in the connection surface whereby the depression is adapted to form, when the turbine inlet conduit is assembled to the other conduit part, at least a part of a pressure reducing volume, the turbo charger further comprising a turbine outlet conduit, and a draining connection an adapted to provide a communication between the depression and the turbine outlet conduit.

According to another aspect of the invention, an internal combustion engine or a vehicle provided with a conduit connection assembly, or a turbo charger is provided.

BRIEF DESCRIPTION OF DRAWINGS

Below embodiments of the invention will be described with reference to the drawings in which FIG. 3 shows a cross-sectional view, with the section oriented as indicated with the line III-III in FIG. 2, FIG. 4 shows a detail of FIG. 3, FIG. 10 shows a perspective, partly sectioned view of a part of the exhaust manifold and a part of the turbo charger in FIG. 7, FIG. 11 shows a detail of FIG. 10, FIG. 13 and FIG. 14 show views corresponding to the views of FIG. 3 and FIG. 4, respectively, with yet another embodiment of the invention.

DETAILED DESCRIPTION

Figure 1:
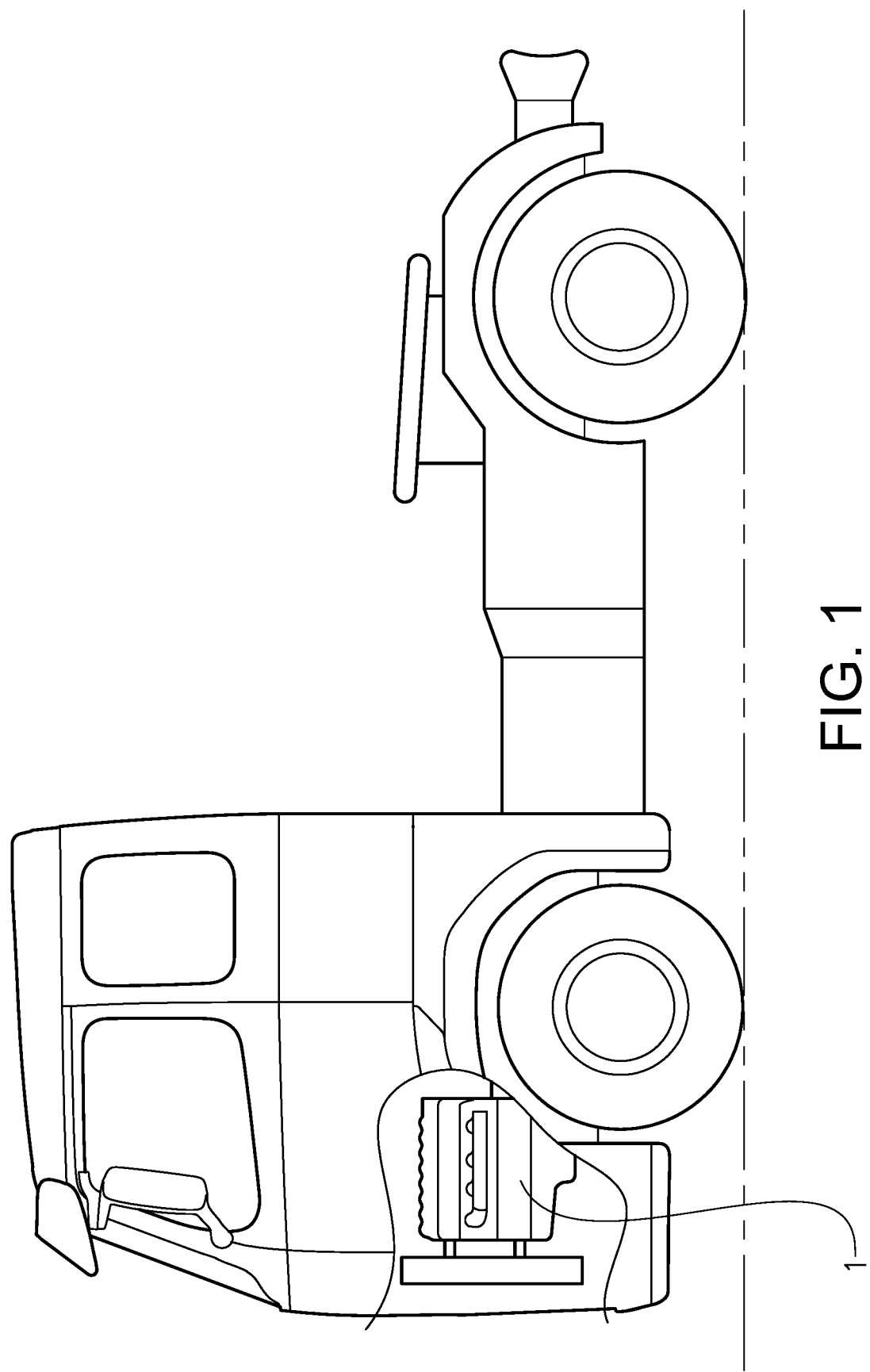
FIG. 1 shows a partially sectioned side view of a vehicle in the form of a truck.

FIG. 1 shows a vehicle in the form of a truck with an internal combustion engine 1 comprising an engine block

Figure 2:
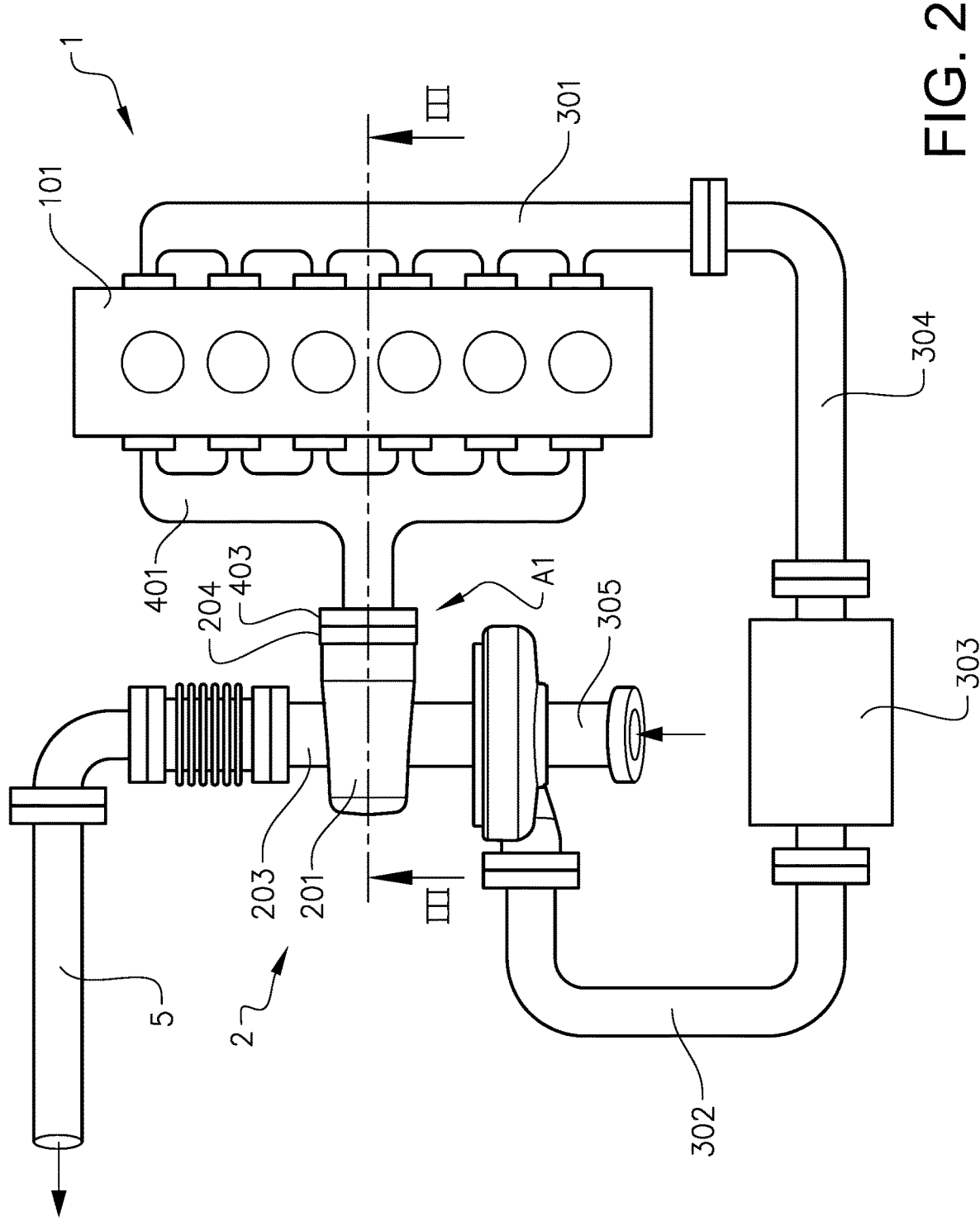
FIG. 2 shows schematically components of an internal combustion engine of the vehicle in FIG. 1, provided with a turbo charger.

101 with a number of cylinders, in this example six. As can be seen in FIG. 2, the engine 1 is provided with a turbo charger 2 adapted to provide pressurised inlet, air to an inlet manifold 301 via a first charged air conduit 302, an intercooler 303 and a second charged air conduit 304. An air admission conduit 305 is adapted to guide air to the turbo charger 2. The turbo charger 2 is adapted to be driven with a flow of exhaust gases provided via an exhaust manifold 401 of the engine. Downstream of the turbo charger 2 an exhaust conduit 5 is provided.

The turbo charger comprises a turbine inlet conduit 201. The turbine inlet conduit 201 and the exhaust manifold 401 form parts of what is herein referred to as a conduit connection assembly A1, wherein the turbine inlet conduit 201 forms what is herein referred to as a first conduit part, and the exhaust manifold forms what is herein referred to as a second conduit part.

As can be seen in FIG. 3, when connected, the turbine inlet conduit 201 and the exhaust manifold 401 form what is herein referred to as a conduit connection delimiting a first fluid conducting volume V1. The turbine inlet conduit 201 and the exhaust manifold 401 present respective connection surfaces 202, 402 adapted to face each other. The connection surfaces are presented by respective flanges 204, 403 of the turbine inlet conduit 201 and the exhaust manifold 401.

The turbo charger 2 presents a pressure reducing volume 6 partly formed in the connection surface 202. As discussed more below, the pressure reducing volume 6 is adapted to reduce the mean pressure and the pressure pulses from the first fluid conducting volume V1. Such pressure pulses may be generated by exhaust gas pulses from the cylinders of the engine 1 at openings of exhaust valves and gas exhaustions from the cylinders.

Figure 5:
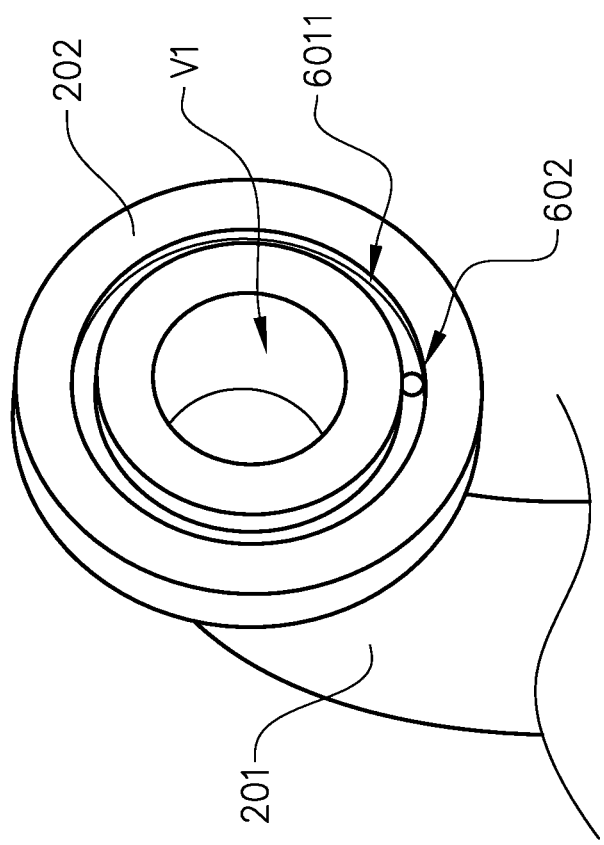
FIG. 5 shows a perspective view of a part shown in FIG. 3.
Figure 7:
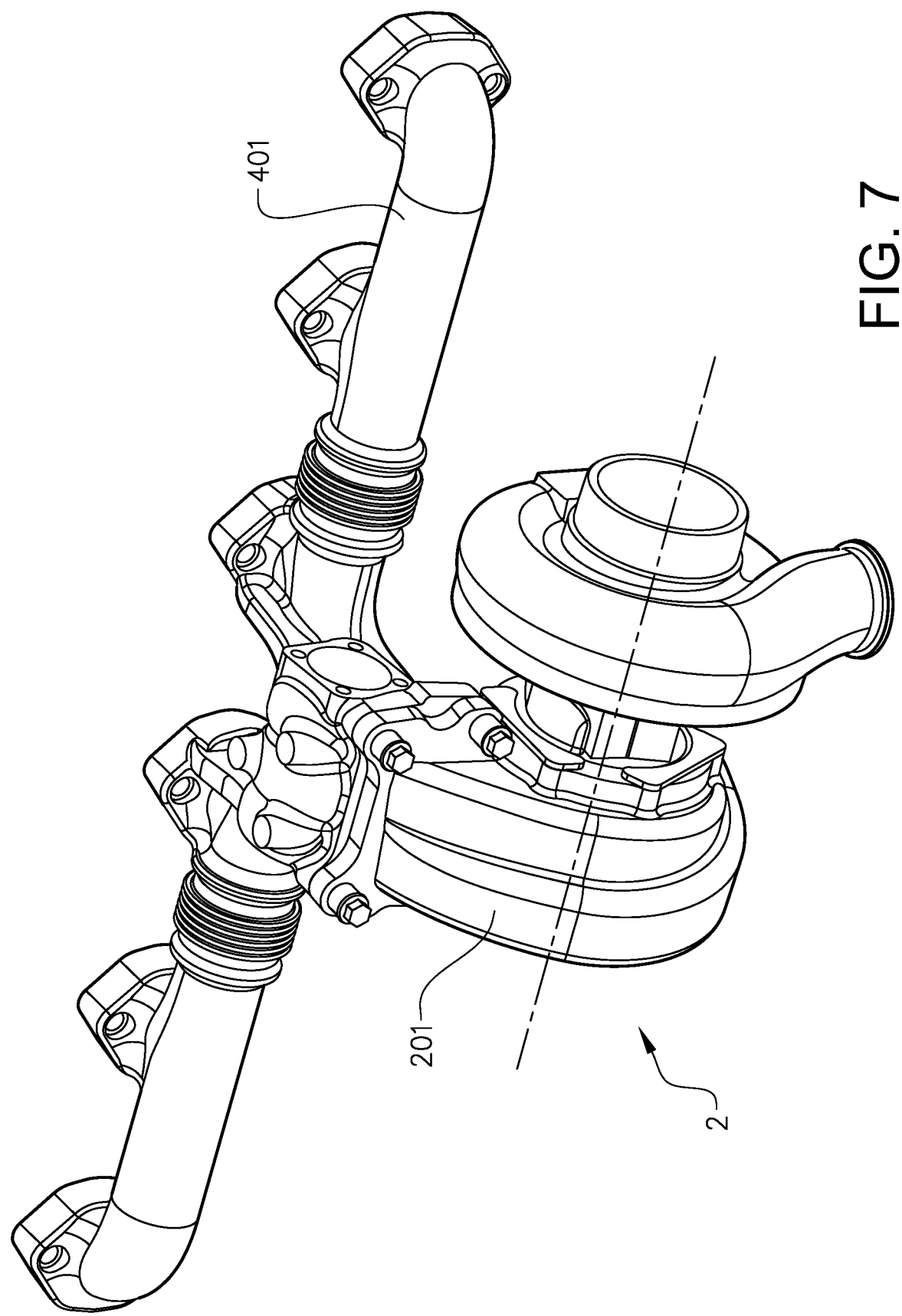
FIG. 7 shows a perspective view of an exhaust manifold and a turbo charger in an alternative embodiment of the invention.

Reference is made also to FIG. 4 and FIG. 5. The pressure reducing volume 6 is partly formed by a depression 6011 in the connection surface 202 of the turbine inlet conduit 201. The depression 6011 is ring shaped and extends around the first fluid conducting volume V1. In the assembled condition, the connection surface 402 of the exhaust manifold 401 partly delimits the pressure reducing volume 6. Thereby, the depression 6011, and a part of the connection surface 402 of the exhaust manifold 401 form a cavity 601 being ring shaped and extending around the first fluid conducting volume V1. Thus, the cavity 601 is formed between the turbine inlet conduit 201 and the exhaust manifold 401. The cavity 601 forms apart of the pressure reducing volume 6. The cavity 601 is provided at a distance DC from the first fluid conducting volume V1. Due to the distance DC between the first conducting volume V1 and cavity 601, it will be possible to restrict, e.g. as exemplified below, the transport of exhaust gases from the first conducting volume V1 to the cavity 601.

As can be seen in FIG. 4, the turbine inlet conduit 201 and the exhaust manifold 401 form, in their assembled state, a slot 7 providing a communication between the first fluid conducting volume V1 and the pressure reducing volume 6. The slot 7 is ring shaped, extends around the first fluid conducting volume V1. The slot 7 also extends in the axial direction of the first fluid conducting volume V1, and is axially offset in relation to the cavity 601.

It should be noted that here the axial direction of the first fluid conducting volume V1 is defined by the local direction of the exhaust gas flow in the first fluid conducting volume V1 at the conduit connection.

The slot 7 is provided by portions of the connection surfaces 202, 402 of the turbine inlet conduit 201 and the exhaust manifold 401 being offset so that a portion of the exhaust manifold 401 extends into the turbine inlet conduit 201. More specifically, an inner portion of the connection surface 202 of the turbine inlet conduit 201 is axially protruded in relation to an outer portion of the turbine inlet conduit connection surface 202. Also, an outer portion of the connection surface 402 of the exhaust manifold 401 is axially protruded in relation to an inner portion of the exhaust manifold connection surface 402. Thereby, the turbine inlet conduit 201 presents a radially outwardly facing surface portion forming in the assembled condition of the conduit connection assembly one of boundaries of the slot 7, and the exhaust manifold 401 presents a radially inwardly facing surface portion forming in the assembled condition the other boundary of the slot 7.

Figure 6:
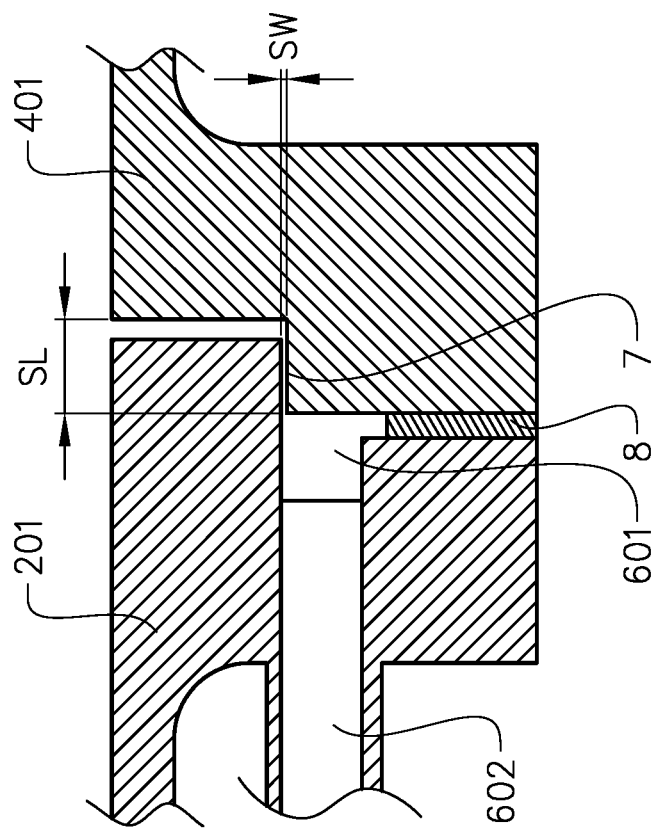
FIG. 6 shows a detail of FIG. 4.

Reference is made also to FIG. 6. The length SL of the slot 7, as seen in a cross-section perpendicular to the circumferential direction of the first fluid conducting volume V1, i.e. as seen in FIG. 3, FIG. 4 and FIG. 6, is at least 0.5 mm, preferably at least 1 mm, more preferably at least 2 mm. The width SW of the slot 7, i.e. the extension of the slot in the radial direction of the first fluid conducting volume V1, is 0.001-1 mm, preferably 0.005-0.5 mm, more preferably 0.01-0.1 mm. The slot 7 thus acts by its small relative dimensions as a restriction for the flow from the first fluid conducting volume V1. Preferably, the cavity 601 presents, in a cross-section perpendicular to a circumferential direction, i.e. as seen in FIG. 3, FIG. 4 and FIG. 6, a cross-sectional area which is 100,000 to 1,000,000 times larger than the slot width SW squared.

As can be seen in FIG. 4, the turbine inlet conduit 201 and the exhaust manifold 401 form, in their assembled state, a sealing abutment radially outside the depression 6011, i.e. radially outside of the cavity 602. The sealing abutment is formed by a sealing element 8 between the connection surfaces 202, 402 of the turbine inlet conduit 201 and the exhaust manifold 401. The sealing element 8 is provided in the form of a gasket extending around the first fluid conducting volume V1.

As can be seen in FIG. 3, the pressure reducing volume 6 presents a draining connection 602. The draining connection 602 is provided in the form of a draining conduit 602 extending from the cavity 601 to a turbine outlet conduit 203 of the turbo charger 2. The turbine outlet conduit 203 forms together with the exhaust conduit 5 a second fluid conducting volume V2. The first and second fluid conducting volumes V1, V2 are arranged to communicate with each other via a pressure change inducing device in the form of a turbine 211 of the turbo charger 2. Thereby, the first and second fluid conducting volumes V1, V2 form a common fluid guide V1, V2. Thus the draining connection 602 is adapted to provide a communication between the first and second fluid conducting volumes V1, V2.

Thus, the pressure reducing volume 6 is in this embodiment composed of the cavity 601 and the draining connection 602. Preferably, the pressure reducing volume 6 is 5,000 to 50,000 times larger than the volume occupied by the slot 7.

Due to the draining connection 602, the cavity 601 and hence the sealing element 8 will be exposed to substantially the same pressure as that in the second fluid conducting volume V2, which during turbo charger operation is considerably lower than in the first fluid conducting volume V1. This will considerably reduce the wear of the sealing element 8. Also, the high ratio of the volume of the cavity 601 and the volume occupied by the slot 7 will effectively reduce the peak pressures of the pressure pulses in the first fluid conducting volume V1, and thereby avoid sealing element exposure to such peak pressures. In addition, the cavity serves to evacuate to the draining connection 602 the flow entering the volume through the slot 7 and originating from the first fluid conducting volume V1. During use of the conduit connection assembly A1, i.e. during operation of the engine, the pressure in the first conducting volume V1 is higher than the pressure in the second conducting volume V2, due to the pressure drop induced by the turbine 211. Therefore, the draining connection 602 will provide a flow from the cavity 601 to the second fluid, conducting volume V2.

FIG. 7-FIG. 11 present a slightly different embodiment of the invention. As understood from FIG. 8 and FIG. 9, differing from the embodiment described with reference to FIG. 3-FIG. 6, the turbine inlet conduit 201 and the exhaust manifold 401 form two first fluid conducting volumes V1. Each first fluid conducting volume V1 is adapted to provide a communication to cylinders in a respective set of cylinders of the engine 1. In this example with a six cylinder engine, each set of cylinders consists of or comprises three cylinders. The double first fluid conducting volume arrangement provides an advantageous retainment of energy in the exhaust gases and pressure pulses therein for the turbo charger.

Figure 9:
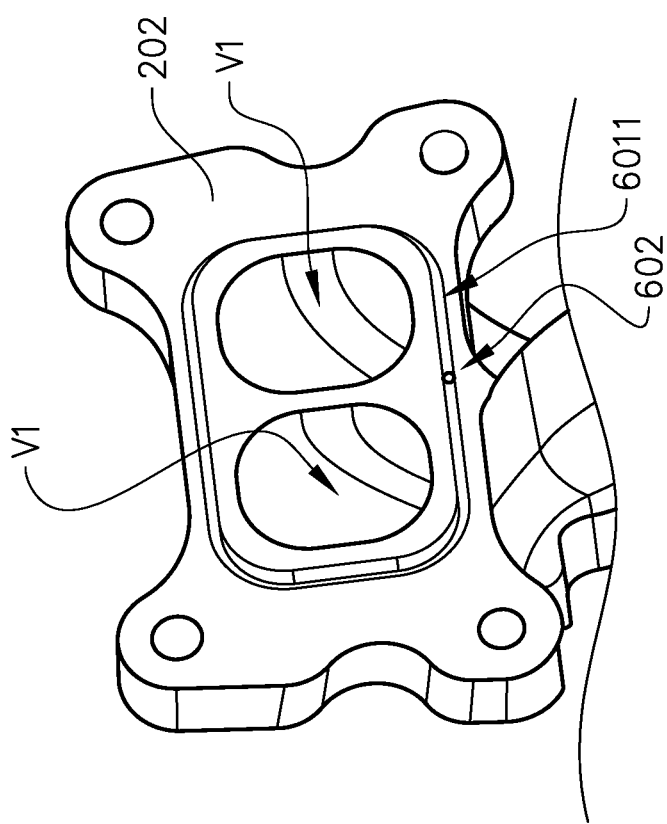
FIG. 9 shows a perspective view of a portion of the part shown in FIG. 8.
Figure 8:
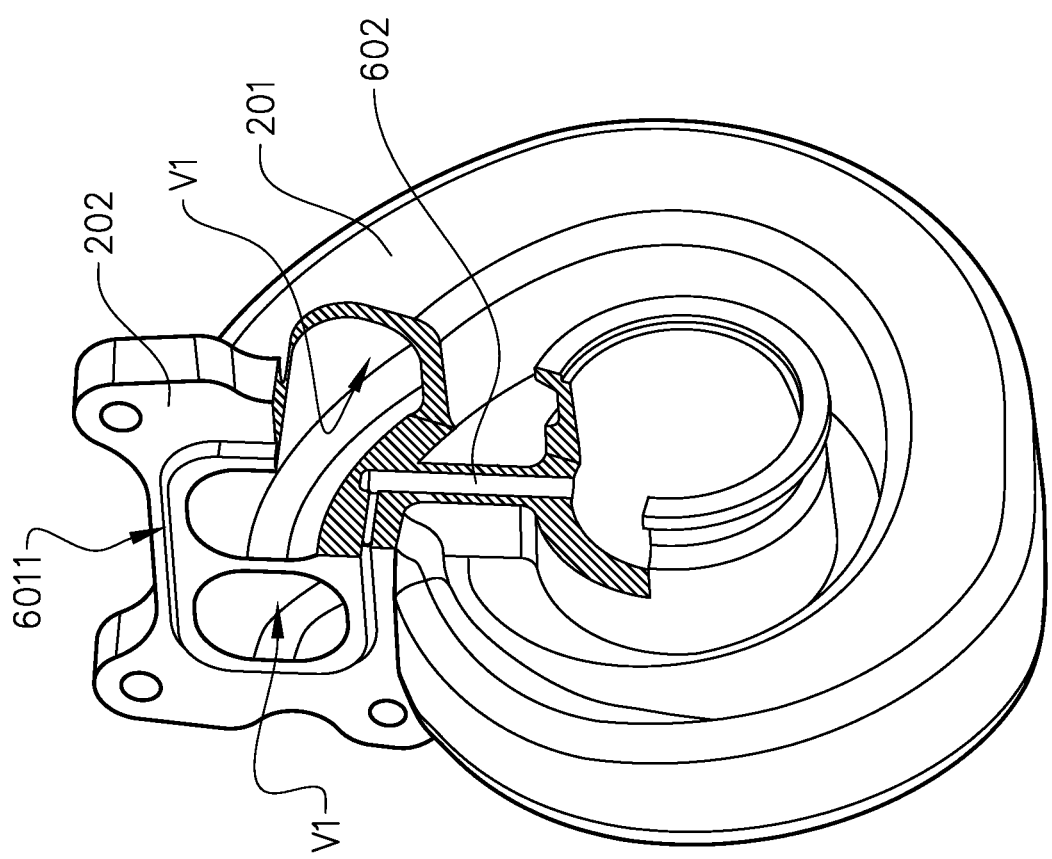
FIG. 8 shows a perspective, partly sectioned view of a part of the turbo charger in FIG. 7.

Also, whereas the connection surfaces 202, 402 are circular in the embodiment described with reference to FIG. 3-FIG. 6, in this embodiment, as understood from FIG. 8 and FIG. 9, the connection surfaces 202 have an approximately rectangular shape. In addition, the depression 6011 of the pressure reducing volume has a rectangular shape with rounded corners.

As can be seen in FIG. 10 and FIG. 11, the draining conduit 602 of the pressure reducing volume is integrated in the body of the turbo charger 2, whereas in the embodiment described with reference to FIG. 3-FIG. 6, the draining conduit 602 extends partly separated from the body of the turbo charger 2.

Figure 12:
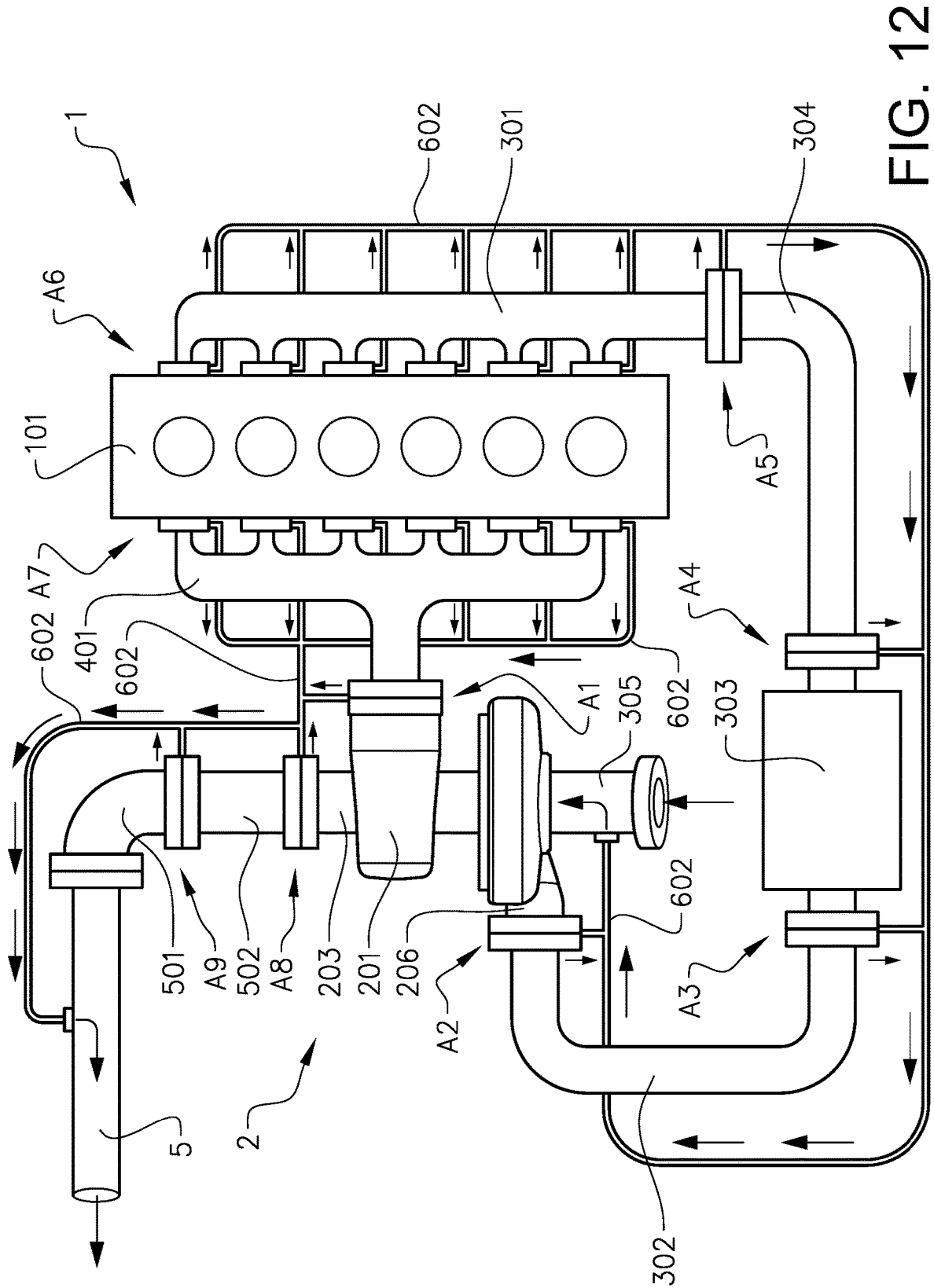
FIG. 12 shows schematically components of an internal combustion engine in a further embodiment of the invention.

Reference is made to FIG. 12. A first conduit connection assembly A1, with a cavity (not shown) of a pressure reducing volume, comprises, similarly to the embodiments described above, a first conduit part in the form of the turbine inlet conduit 201 of the turbo charger 2, and a second conduit part in the form of the exhaust manifold 401. In addition, further conduit connection assemblies are provided at a number of locations in the intake and exhaust systems of the engine.

A second conduit connection assembly A2, with a cavity of a pressure reducing volume, comprises a first conduit part in the form of a compressor outlet 206 of the turbo charger 2 and a second conduit part in the form of the first charged air conduit 302. A third conduit connection assembly A3, with a cavity of a pressure reducing volume, comprises a first conduit part in the form of the first charged air conduit 302 and a second conduit part in the form of the intercooler 303. A fourth conduit connection assembly A4, with a cavity of a pressure reducing volume, comprises a first conduit part in the form of the intercooler 303 and a second conduit part in the form of the second charged air conduit 304. A fifth conduit connection assembly A5, with a cavity of a pressure reducing volume, comprises a first conduit part in the form of the second charged air conduit 304 and a second conduit part in the form of the inlet manifold 301. A sixth conduit connection assembly A6, with a cavity of a pressure reducing volume, comprises a first conduit part in the form of the inlet manifold 301 and a second conduit part in the form of the block 101 of the engine 1. A seventh conduit connection assembly A7, with a cavity of a pressure reducing volume, comprises a first conduit part in the form of the block 101 of the engine 1 and a second conduit part in the form of the exhaust manifold 401. An eighth conduit connection assembly A8, with a cavity of a pressure reducing volume, comprises a first conduit part in the form of an exhaust system unit 502, e.g. in the form of an exhaust valve or an exhaust brake, and a second conduit part in the form of the turbine outlet conduit 203. A ninth conduit connection assembly A9, with a cavity of a pressure reducing volume, comprises a first conduit part in the form of a turbo compound unit 501, connected to the engine crankshaft as is known per se, and a second conduit part in the form of the exhaust system unit 502.

All conduit connection assemblies A1-A9 are provided at locations with relatively high pressures during, operation of the turbo charger 2. The second, third, fourth, fifth and sixth conduit connection assemblies A2, A3, A4, A5, A6 share a draining conduit 602 by which communication is established with the air admission conduit 305, which has a relatively low pressure during the turbo charger operation. The first, seventh, eighth and ninth conduit connection assemblies A1, A7, A8, A9 share a draining conduit 602 by which communication is established with the exhaust conduit 5, which has a relatively low pressure during the turbo charger operation.

For each of conduit connection assemblies A1-A9, first and second fluid conducting volumes form a common fluid guide.

In the first conduit connection assembly A1, a first fluid conducting volume is formed by the turbine inlet conduit 201 of the turbo charger 2, and the exhaust manifold 401, and a second fluid conducting volume is formed by the exhaust conduit 5. During operation of the engine, the pressure in the first conducting volume is higher than the pressure in the second conducting volume, due to the pressure drop induced by the turbine of the turbo charger 2, thereby forming what is herein referred to as a pressure change inducing device.

For the second, third, fourth, fifth and sixth conduit connection assemblies A2-A6, during operation of the engine, the pressure in the first conducting volume is higher than the pressure in the second conducting volume, due to the pressure increment induced by the compressor of the turbo charger 2, thereby forming what is herein referred to as a pressure change inducing device. In the second conduit connection assembly A2, the first fluid conducting volume is formed by the compressor outlet 206 of die turbo charger 2 and the first charged air conduit 302, and the second fluid conducting volume is formed by the air admission conduit 305. In the third conduit connection assembly A3, the first fluid conducting volume is formed by the first charged air conduit 302 and the intercooler 303, and the second fluid conducting volume is formed by the air admission conduit 305. In the fourth conduit connection assembly A4, the first fluid conducting volume is formed by the intercooler 303 and the second charged air conduit 304, and the second fluid conducting volume is formed by the air admission conduit 305. In the fifth conduit connection assembly A5, the first fluid conducting volume is formed by the second charged air conduit 304 and the inlet manifold 301, and the second fluid conducting volume is formed by the air admission conduit 305. In the sixth conduit connection assembly A6, the first fluid conducting volume is formed by the inlet manifold 301 and the block 101 of the engine 1, and the second fluid conducting volume is formed by the air admission conduit 305.

In the seventh conduit connection assembly A7, the first fluid conducting volume is formed by the block 101 of the engine 1 and the exhaust manifold 401, and the second fluid conducting volume is formed by the exhaust conduit 5. During operation of the engine, the pressure in the first conducting volume is higher than the pressure in the second conducting volume, due to the pressure drop induced by the turbine of the turbo charger 2, thereby forming what is herein referred to as a pressure change inducing device.

In the eighth conduit connection assembly A8, the first fluid conducting volume is formed by the turbine outlet conduit 203 and the exhaust system unit 502, and the second fluid conducting volume is formed by the exhaust conduit 5. During operation of the engine, the pressure in the first conducting volume is higher than the pressure in the second conducting volume, due to the pressure drop induced by an exhaust valve or an exhaust brake in the exhaust system unit 502, thereby forming what is herein referred to as a pressure change inducing device.

In the ninth conduit connection assembly A9, the first fluid conducting volume is formed by the exhaust system unit 502 and the turbo compound unit 501, and the second fluid conducting volume is formed by the exhaust conduit 5. During operation of the engine, the pressure in the first conducting volume is higher than the pressure in the second conducting volume, due to the pressure drop induced by the turbo compound unit 501, thereby forming what is herein referred to as a pressure change inducing device.

For each of the conduit connection assemblies A1-A9 in view of the pressure drop from the first fluid conducting volume to the second fluid conducting volume, the respective draining connection 602 will provide a flow from the respective cavity between the respective first and second conduit parts of the respective conduit connection, to the second fluid conducting volume.

Thus embodiments of the invention can be implemented where there is a pressure drop from the conduit connection to a location downstream of the conduit connection. Also, embodiments of the invention can be implemented where there is a pressure drop from the conduit connection to a location upstream of the conduit connection. It should be noted that the conduit connection arrangements A1-A9 may be provided in any suitable embodiment of the invention, e.g. as described with reference to FIG. 3-FIG. 11. It should also be noted that the second, third, fourth, fifth and sixth conduit connection assemblies A2, A3, A4, A5, A6 are all provided on a cool side of the engine 1. Thereby, the sealing abutment formed radially outside of the cavity 602 (see FIG. 4) may be formed by the connection surfaces directly contacting each other, i.e. without any sealing element 8.

FIGS. 13 and 14 shows parts of a connection arrangement according to a further embodiment of the invention. In this embodiment, the pressure reducing volume 6 does not comprise any draining connection 602. Thus, the pressure reducing volume 6 merely comprises a cavity 601 formed by a depression 6011 as described with reference to FIG. 3 and FIG. 4. Although in such embodiments, the sealing element 8 will experience the same mean pressure as that of the first fluid conducting volume V1, the high ratio of the volume of the cavity 601 and the volume occupied by the slot 7 will effectively reduce the peak pressures of the pressure pulses in the first fluid conducting volume V1, and thereby avoid sealing element exposure to such peak pressures.

Figure 16:
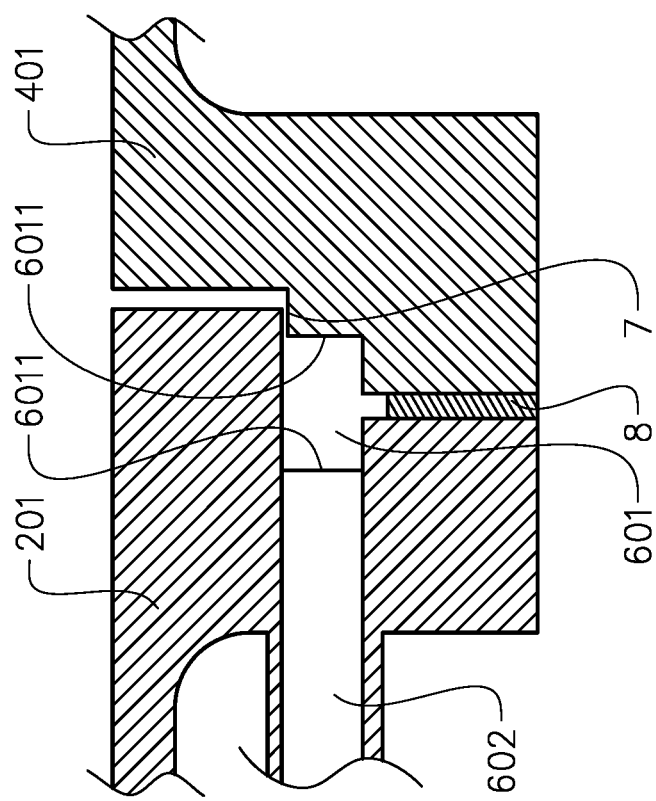
FIG. 15-FIG. 17 show respective details corresponding to the detail shown in FIG. 6, with respective alteration according to further embodiments of the invention.
Figure 15:
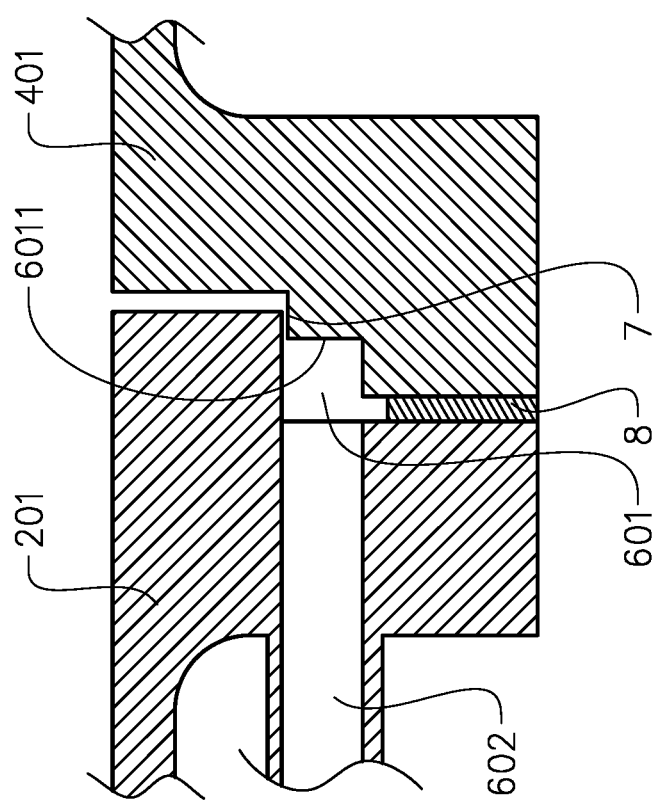
Figure 17:
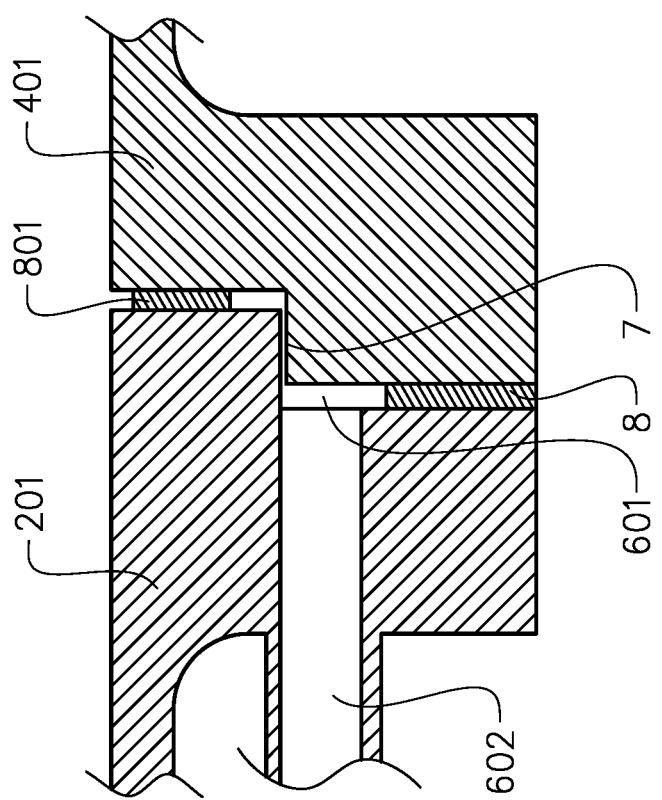

FIG. 15-FIG. 17 shows examples of alternative ways to provide the cavity 601 between the first and second conduit parts 201, 401. In the embodiment in FIG. 15, the cavity 601 is formed partly by a depression 6011 in the second conduit part 401. In the embodiment in FIG. 16, the cavity 601 is formed by a depression 6011 in the first conduit part 201 as well as a depression 6011 in the second conduit part 401.

In the embodiment in FIG. 17, the cavity 601 is formed by a separation between the first and second conduit parts 201, 401, which separation is provided by the sealing element 8 located radially outside of the cavity 601, as well as an additional sealing element 801 located radially inside the cavity 601. The inner sealing element 801 is preferably more elastic than the outer sealing element 8 so that substantially all clamping pressure in the conduit connection affects the outer seal sealing element 8.

Aspects, and embodiments of the invention may be defined by one or more of the following numbered clauses:

1. A conduit connection assembly, wherein the assembly comprises a first conduit part and a second conduit part, adapted to be assembled to form a conduit connection delimiting a fluid conducting volume, wherein one of the first and second conduit parts presents a connection surface adapted to face the other of the first and second conduit parts, wherein a pressure reducing volume is at least partly formed in the connection surface.

2. A conduit connection assembly according to clause 1, wherein the pressure reducing volume is adapted to reduce pressure pulses from the fluid conducting volume.

3. A conduit connection assembly according to any one of the preceding clauses, wherein the pressure reducing volume is at least partly delimited by the first conduit part as well as the second conduit part.

4. A conduit connection assembly according to any one of the preceding clauses, wherein the pressure reducing volume is at least partly formed by a depression in the connect surface.

5. A conduit connection assembly according to any one of the preceding clauses, wherein the pressure reducing volume presents a cavity being closed loop shaped and extending around the fluid conducting volume.

6. A conduit connection assembly according to any one of the preceding clauses, adapted to present a slot adapted to provide a communication between the fluid conducting volume and the pressure reducing volume.

7. A conduit connection assembly according to clause 6, wherein the first and second conduit parts are adapted to form the slot in their assembled state.

8. A conduit connection assembly according to any one of clauses 6-7, wherein the pressure reducing volume is 5,000 to 50,000 times larger than a volume occupied by the slot.

9. A conduit connection assembly according to any one of clauses 6-8, wherein the pressure reducing volume presents a cavity, the cavity and the slot being closed loop shaped and extending around the fluid conducting volume, the cavity presenting, in a cross-section perpendicular to a circumferential direction, a cross-sectional area which is 100,000 to 1,000,000 times larger than the slot width squared.

10. A conduit connection assembly according to any one of clauses 6-9, wherein the slot extends at least partly in an axial direction of the conduit connection assembly in its assembled condition.

11. A conduit connection assembly according to any one of clauses 6-10, wherein the slot extends at least partly in a radial direction of the conduit connection assembly in its assembled condition.

12. A conduit connection assembly according to any one of clauses 6-11, wherein the width of the slot is 0.001-1 mm, preferably 0.005-0.5 mm, more preferably 0.01-0.1 mm.

13. A conduit connection assembly according to any one of clauses 6-12, wherein the slot extends around the fluid conducting volume, and the length of the slot, as seen in a cross-section perpendicular to a circumferential direction, is at least 0.5 mm, preferably at least 1 mm, more preferably at least 2 mm.

14. A conduit connection assembly according to any one of the preceding clause, wherein the pressure reducing volume is at least partly formed by a cavity, and the first and second conduit parts are adapted to form, in their assembled state, a sealing abutment radially outside the cavity.

15. A conduit connection assembly according to clause 14, wherein the cavity and the sealing abutment extend around the fluid conducting volume, preferably forming respective closed loops.

16. A conduit connection assembly according to any one of clauses 14-15, wherein the cavity is at least partly formed by a depression in the connection surface.

17. A conduit connection assembly according to any one of clauses 14-16, wherein the first and second conduit parts are adapted to form the sealing abutment by directly contacting each other.

18. A conduit connection assembly according to any one of clauses 14-16, wherein the first and second conduit parts are adapted to form the sealing abutment by a sealing element between the first and second conduit parts.

19. A conduit connection assembly according to clause 18, wherein the sealing element is a gasket.

20. A conduit connection assembly according to any one of the preceding clauses, wherein the first conduit part is a turbine inlet conduit of a turbo charger for an internal combustion engine.

21. A conduit connection assembly according to any one of the preceding clauses, wherein the second conduit part is an exhaust gas conveying part, e.g. an exhaust gas outlet manifold, adapted for conveying exhaust gases from an internal combustion engine.

22. A conduit connection assembly according to any one of clauses 1-19, wherein the first conduit part is a compressor outlet conduit of a turbo charger for an internal combustion engine.

23. A conduit connection assembly according to any one of clauses 1-19 or clause 22, wherein the second conduit part is a charged air conduit for an internal combustion engine.

24. A conduit connection assembly according to any one of clauses 1-19, 22 or 23, wherein the first conduit part is an intercooler for an air inlet of an internal combustion engine.

25. A conduit connection assembly according to any one of clauses 1-19, wherein the first conduit part is an internal combustion engine and the second conduit part is an air inlet, manifold or an exhaust gas outlet manifold.

26. A conduit connection assembly according to any one of clauses 1-21, wherein the first conduit part is a turbo compound unit.

27. A conduit connection assembly according to any one of the preceding clauses, wherein the pressure reducing volume presents a draining connection.

28. A conduit connection assembly according to clause 27, wherein the fluid conducting volume is a first fluid conducting volume, the conduit connection assembly further being adapted to present, in its assembled state, a second fluid conducting volume, and the draining connection is adapted to provide a communication between the first and second fluid conducting volumes.

29. A conduit, connection assembly according to clause 28, wherein the first fluid conducting volume is adapted to communicate with an internal combustion engine, whereby during operation of the internal combustion engine, the pressure in the first conducting volume is higher than the pressure in the second conducting volume.

30. A conduit connection assembly according to clause 29, wherein, in the assembled state of the assembly, the first fluid conducting volume is partly formed by a turbine inlet conduit of a turbo charger for an internal combustion engine, and the second fluid conducting volume is at least partly formed by a turbine outlet conduit of the turbo charger.

31. A turbine inlet conduit for a turbo charger for an internal combustion engine, wherein the turbine inlet conduit is adapted to be assembled to another conduit part, and presents a connection surface adapted to face the other conduit part, wherein a depression is formed in the connection surface whereby the depression is adapted to form, when the turbine inlet conduit is assembled to the other conduit part, at least a part of a pressure reducing volume.

32. A turbine inlet conduit according to clause 31, wherein the depression presents a dosed loop shape, and is adapted to extend around a fluid conducting volume formed by the turbine inlet conduit and the other conduit part in their assembled condition.

33. A turbo charger for an internal combustion engine, comprising a turbine inlet conduit according to any one of clauses 31-32, the turbo charger further comprising a turbine outlet conduit, and a draining connection an adapted to provide a communication between the depression and the turbine outlet conduit.

34. A vehicle provided with a conduit connection assembly according to any one of clauses 1-30, a turbine inlet conduit according to any one of clauses 31-32, or a turbo charger according to any one of clauses 33.

The invention claimed is:
1. A conduit connection assembly comprising:
a first conduit part;
a second conduit part, wherein the first and second conduit parts are assembled to form a conduit connection delimiting a first fluid conducting volume, the first and second conduit parts presenting respective connection surfaces adapted to face each other, wherein the conduit connection assembly presents a second fluid conducting volume, the first and second fluid conducting volumes being arranged to communicate with each other via a pressure change inducing device so as to form a common fluid guide, whereby during use of the conduit connection assembly the pressure in the first fluid conducting volume is higher than the pressure in the second fluid conducting volume;
a cavity being formed between the first and second conduit parts at a distance (DC) from the first fluid conducting volume, the cavity being at least partly formed by at least one of the connection surfaces and/or partly located directly adjacent at least one of the connection surfaces, wherein the first and second conduit parts are adapted to form, in their assembled state, a sealing abutment radially outside the cavity;
a draining connection being adapted to provide a communication between the cavity and the second fluid conducting volume, the combination of the draining connection and the cavity forming a pressure reducing volume;
a slot adapted to provide a communication between the first fluid conducting volume and the pressure reducing volume, the first and second conduit parts being adapted to form the slot in their assembled state, the slot extending in an axial direction of the conduit connection assembly in its assembled condition.

2. An internal combustion engine provided with the conduit connection assembly according to claim 1, wherein the first fluid conducting volume is adapted to communicate with an engine block of the internal combustion engine.

3. The conduit connection assembly according to claim 1, wherein the pressure reducing volume is adapted to reduce pressure pulses from the first fluid conducting volume.

4. The conduit connection assembly according to claim 1, wherein the pressure reducing volume is at least partly delimited by the first conduit part as well as the second conduit part.

5. The conduit connection assembly according to claim 1, wherein the pressure reducing volume is at least partly formed by a depression in the connection surface.

6. The conduit connection assembly according to claim 1, wherein the cavity is closed loop shaped and extends around the first fluid conducting volume.

7. The conduit connection assembly according to claim 1, wherein the pressure reducing volume is 5,000 to 50,000 times larger than a volume occupied by the slot.

8. The conduit connection assembly according to claim 1, wherein the cavity and the slot are closed loop shaped and extending around the first fluid conducting volume, the cavity presenting, in a cross-section perpendicular to a circumferential direction, a cross-sectional area which is 100,000 to 1,000,000 times larger than the slot width squared.

9. The conduit connection assembly according to claim 1, wherein the width of the slot is 0.001-1 mm.

10. The conduit connection assembly according to claim 1, wherein the slot extends around the first fluid conducting volume, and the length of the slot, as seen in a cross-section perpendicular to a circumferential direction, is at least 0.5 mm.

11. The conduit connection assembly according to claim 1, wherein the cavity and the sealing abutment extend around the first fluid conducting volume.

12. The conduit connection assembly according to claim 1, wherein the first and second conduit parts are adapted to form the sealing abutment by directly contacting each other.

13. The conduit connection assembly according to claim 1, wherein the first and second conduit parts are adapted to form the sealing abutment by a sealing element between the first and second conduit parts.

14. The conduit connection assembly according to claim 13, wherein the sealing element is a gasket.

15. The conduit connection assembly according to claim 1, wherein the first conduit part is a turbine inlet conduit of a turbo charger for an internal combustion engine.

16. The conduit connection assembly according to claim 1, wherein the second conduit part is an exhaust gas conveying part, e.g. an exhaust gas outlet manifold, adapted for conveying exhaust gases from an internal combustion engine.

17. The conduit connection assembly according to claim 1, wherein the first conduit part is a compressor outlet conduit of a turbo charger for an internal combustion engine.

18. The conduit connection assembly according to claim 1, wherein the second conduit part is an air inlet conduit for an internal combustion engine.

19. The conduit connection assembly according to claim 1, wherein the first conduit part is an intercooler for an air inlet of an internal combustion engine.

20. The conduit connection assembly according to claim 1, wherein the first conduit part is an engine block of the internal combustion engine and the second conduit part is an air inlet manifold or an exhaust gas outlet manifold.

21. The conduit connection assembly according to claim 1, wherein the first conduit part is a turbo compound unit.

22. The conduit connection assembly according to claim 1, wherein the draining connection is adapted to provide a communication between the first and second fluid conducting volumes.

23. The conduit connection assembly according to claim 1, in the assembled state of the assembly, the first fluid conducting volume is partly formed by a turbine inlet conduit of a turbo charger for an internal combustion engine, and the second fluid conducting volume is at least partly formed by a turbine outlet conduit of the turbo charger.

24. The conduit connection assembly according to claim 1, wherein the first conduit part is a turbine inlet conduit of a turbo charger for an internal combustion engine, wherein the cavity is at least partly formed by a depression fanned in the connection surface of the first conduit part, the second fluid conducting volume being at least partly formed by a turbine outlet conduit of the turbo charger, and the draining connection an adapted to provide a communication between the depression and the turbine outlet conduit.

25. The conduit connection assembly according to claim 24, wherein the depression presents a closed loop shape, and is adapted to extend around the first fluid conducting volume.

26. A vehicle provided with the conduit connection assembly according to claim 1.

* * * * *